(No Model.)  6 Sheets—Sheet 1.
F. BENOIT.
STUFFING MACHINE.
No. 286,171.  Patented Oct. 9, 1883.
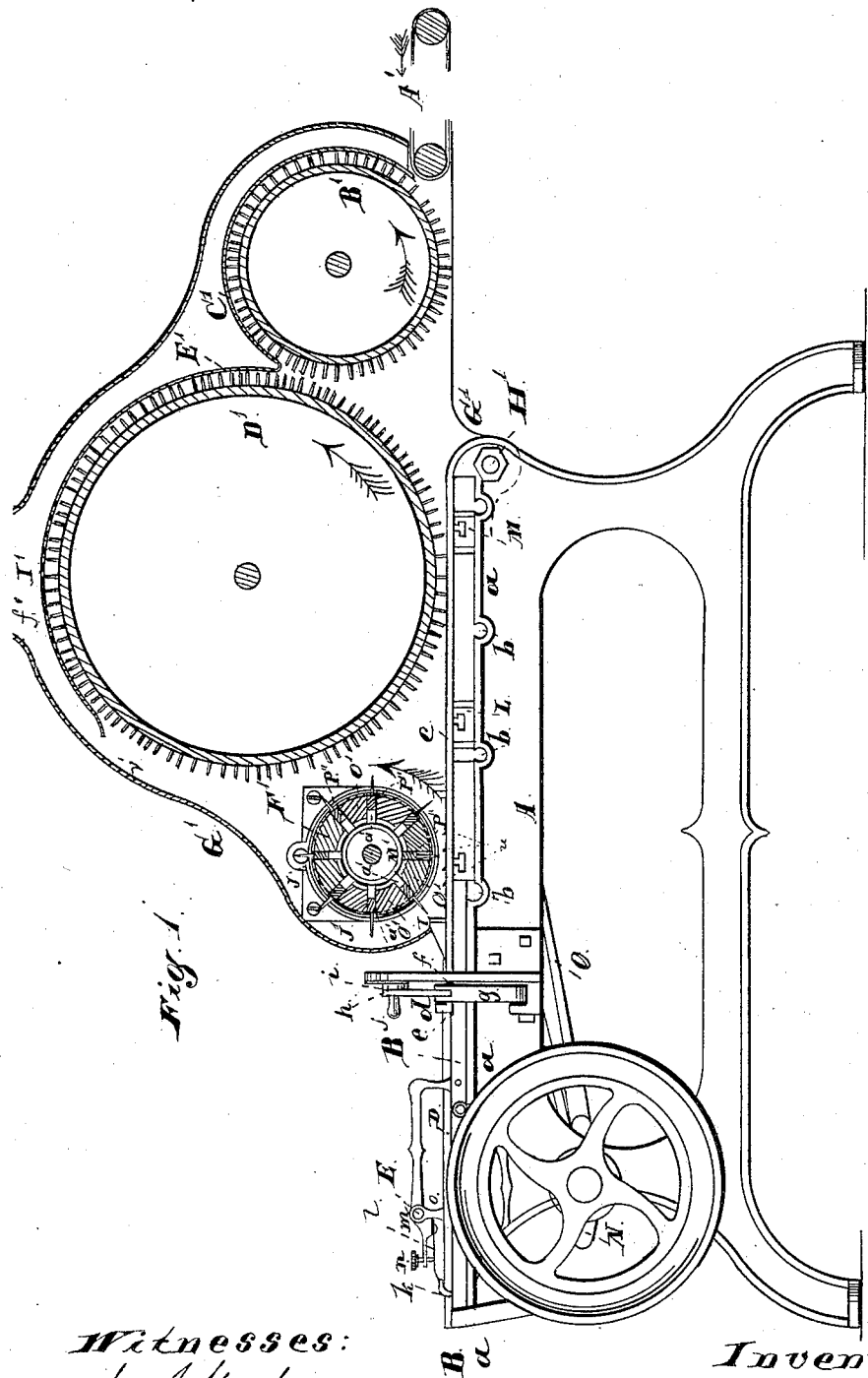
Witnesses:
E. A. West
A. H. Adams.
Inventor:
Fredrick Benoit (No Model.)
6 Sheets—Sheet 2.
F. BENOIT.
STUFFING MACHINE.
No. 286,171.
Patented Oct. 9, 1883.
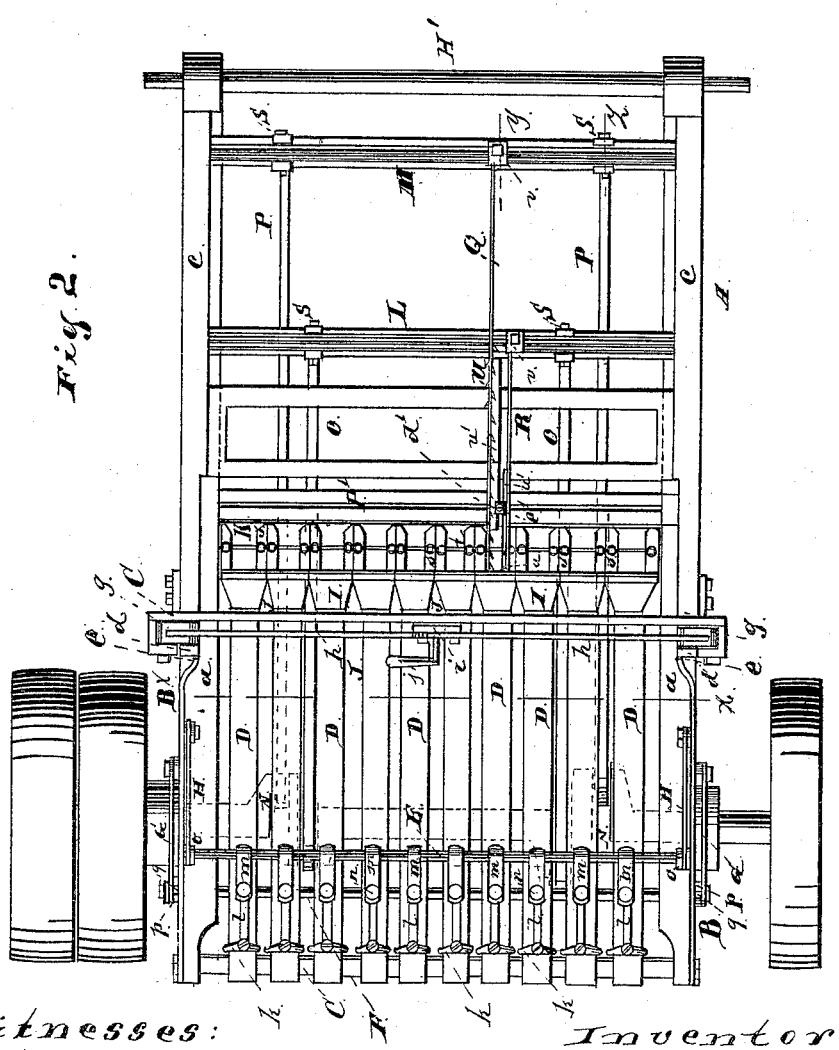
Witnesses:
Inventor:
Fredrick Benoit (No Model.)
6 Sheets—Sheet 3.
F. BENOIT.
STUFFING MACHINE.
No. 286,171.  Patented Oct. 9, 1883.
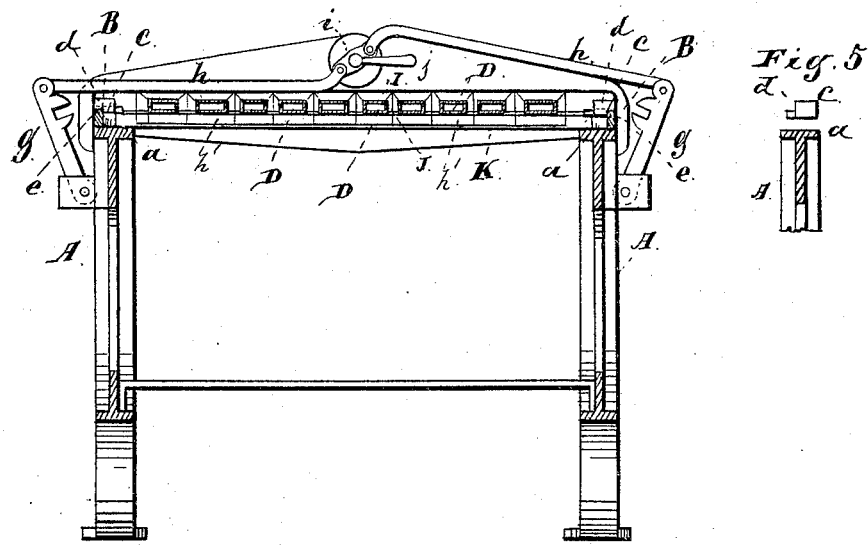
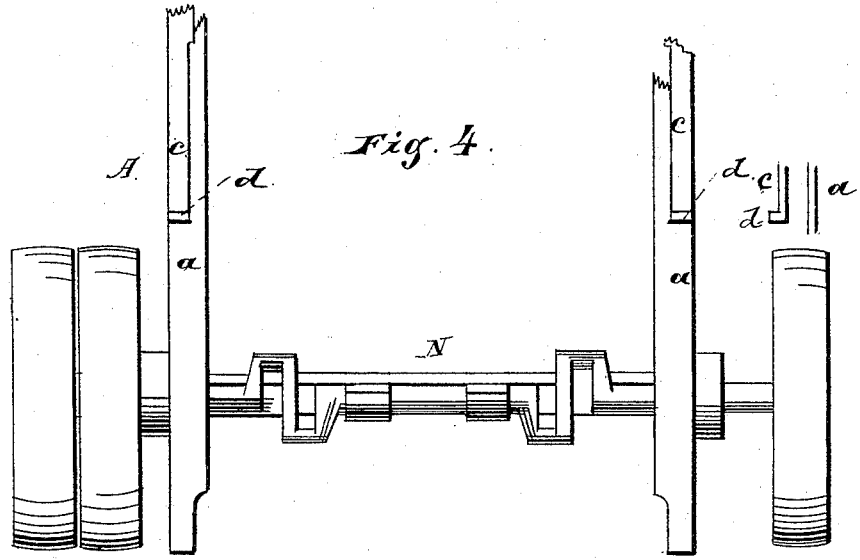
Witnesses:
E. A. West.
A. H. Adams.
Inventor:
Fredrick Benoit (No Model.) 6 Sheets—Sheet 4.

F. BENOIT.
STUFFING MACHINE.

No. 286,171. Patented Oct. 9, 1883.

Witnesses:
E. A. West.
A. H. Adams.

Inventor:
Fredrick Benoit.

(No Model.) 6 Sheets—Sheet 5.
F. BENOIT.
STUFFING MACHINE.
No. 286,171. Patented Oct. 9, 1883.
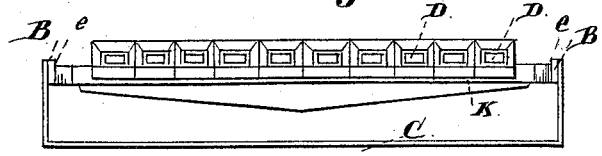
Fig. 15ᶜ
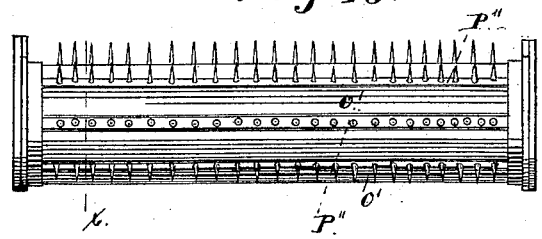
Fig. 16.
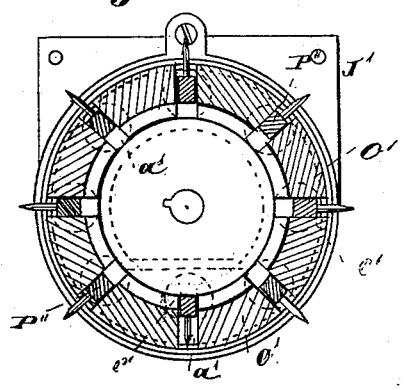
Fig. 17.
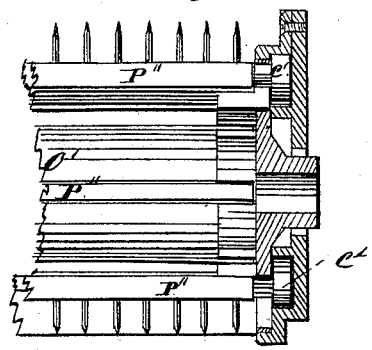
Fig. 18.
Witnesses:
E. A. West.
A. H. Adams.
Inventor:
Fredrick Benoit
N. PETERS, Photo-Lithographer, Washington, D. C.

(No Model.) 6 Sheets—Sheet 6.
F. BENOIT.
STUFFING MACHINE.
No. 286,171. Patented Oct. 9, 1883.
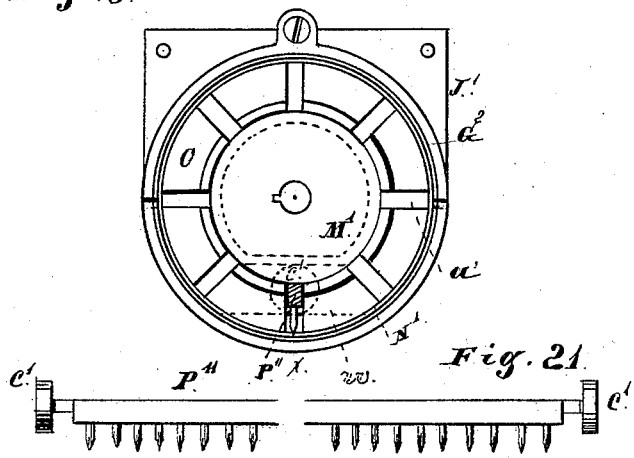
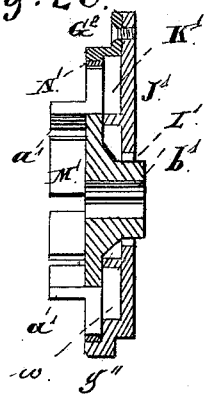
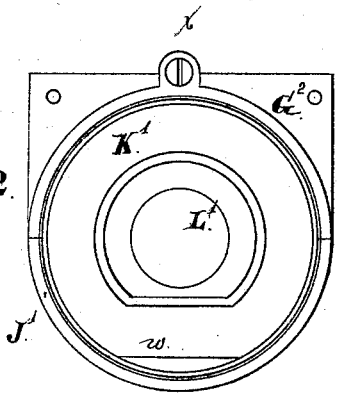
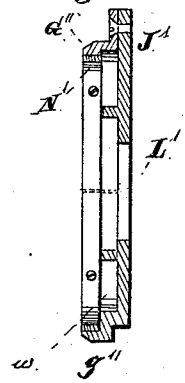
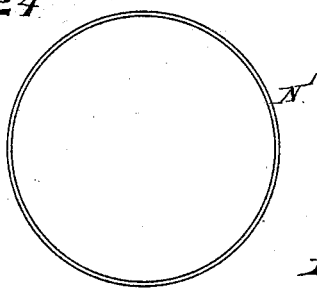
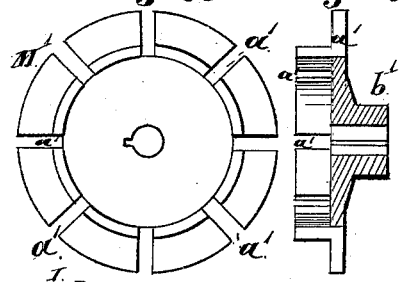
Witnesses:
E. A. West
A. H. Adams
Inventor.
Frederick Benoit

UNITED STATES PATENT OFFICE.

FREDRICK BENOIT, OF CHICAGO, ILLINOIS, ASSIGNOR TO HIMSELF AND GUSTAVUS STONE, OF BELOIT, WISCONSIN.

STUFFING-MACHINE.

SPECIFICATION forming part of Letters Patent No. 286,171, dated October 9, 1883.

Application filed December 11, 1882. (No model.)

*To all whom it may concern:*

Be it known that I, FREDRICK BENOIT, residing at Chicago, in the county of Cook and State of Illinois, and a citizen of the United States, have invented new and useful Improvements in Stuffing-Machines, of which the following is a full description, reference being had to the accompanying drawings, in which—

Figure 6:
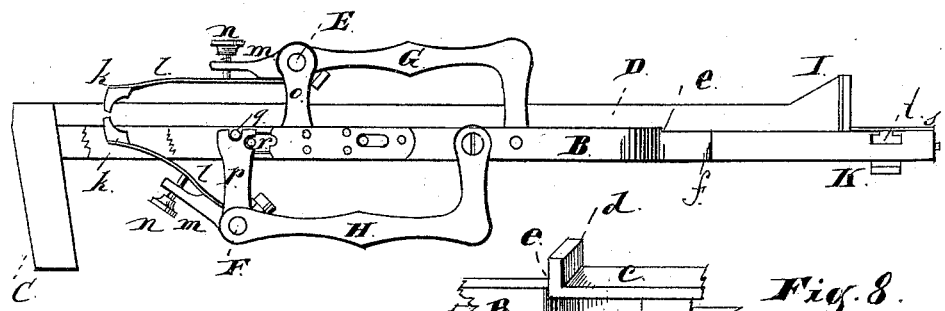
Figure 8:
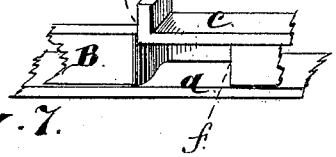
Figure 7:
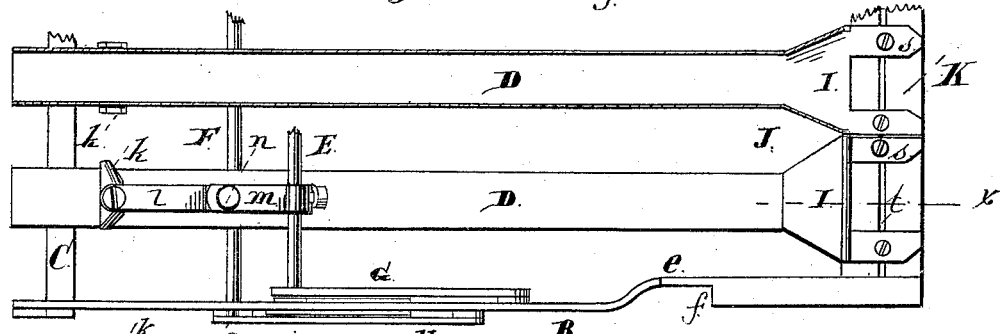
Figure 10:
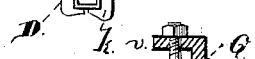
Figure 12:
Figure 13:
Figure 9:
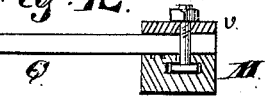
Figure 11:
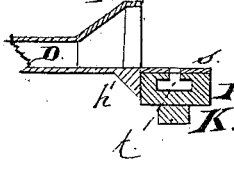
Figure 14:
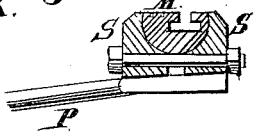

Figure 1 is a side elevation, the upper part being in section. Fig. 2 is a plan, the feeding-rollers being removed. Fig. 3 is a vertical cross-section at line $x$ of Fig. 2, looking to the right. Fig. 4 is a plan showing the crank which drives the packers. Fig. 5 is a detail, being a section of the parts shown, taken at the same line as Fig. 3. Fig. 6 is a side elevation of the parts shown. Fig. 7 is a detail, being a plan of the parts shown, except that one tube is shown in section. Fig. 8 is a detail in perspective. Fig. 9 is a detail, being a section at line $x$ of Fig. 7. Fig. 10 is a detail, being an end view of one tube and the tension-clamps. Fig. 11 is a detail. Figs. 12, 13, and 14 are details. Fig. 15 is an end elevation of the parts shown. Fig. 16 is a side elevation, showing one of the feed-cylinders, F', in place in its bearings. Fig. 17 is a cross-section at line $x$ of Fig. 16. Fig. 18 is a vertical longitudinal section of the parts shown. Figs. 19 and 20 are details; Fig. 21, a side elevation of one of the toothed bars in the feeding-cylinder F'. Figs. 22, 23, 24, 25, and 26 are details. Fig. 27 shows a case on a tube. Figs. 1, 2, 3, 4, 5, 15, 16, 27 are on the same scale. All of the remaining figures are enlarged. The main figures are about one-eighth of full size.

The primary object of my invention is to construct a machine well adapted to be used in stuffing hair, wool, &c., into small cases for use in making pads for horse-collars; but the use of my invention is not limited to this specific purpose. That which I claim as my improvements will appear from the claims.

In the drawings, A represents a main frame, the part $a$ of which forms a track, upon which the frame which carries the packing-tubes is supported, as well as the ends of the sliding bars L M. This part $a$ is provided with depressions $b$, into which dust and refuse which may accumulate upon the top of $a$ can fall by the action of the moving parts on the track.

$c$ is a piece or bar a little distance above $a$, supported at suitable intervals, the space between $a$ and $c$ being for the most part open. $c$ does not extend the whole length of the machine, but terminates at $d$, where it is turned upward a little, forming a stop.

B are the side pieces, and C K cross-bars, of a secondary frame, which carries a series of tubes, D. One end of each tube is rigidly secured to the cross-bar K, as hereinafter described. The rear ends of the tubes are free, and they, and the frame which carries them, can be detached from or connected with the main frame. In Figs. 1 and 2 this secondary frame and the tubes are shown in place in the machine, ready for use, the side pieces B resting upon parts $a$ of the main frame and passing partly under the piece $c$, as shown in Fig. 1. The side bars B are curved inward near the forward end, as shown in Fig. 7, and are provided with two shoulders, one on the top, (marked $e$,) and the other at the side, $f$. $e$, when the secondary frame is in place, comes in contact with the end of the part $c$. When the secondary frame B is in place, it is held in position by means of locking devices (shown in Fig. 3) consisting of notched bars, one on each side of the machine and pivoted thereto, (marked $g$,) and two rods, $h\, h$, pivoted at their outer ends to the upper ends of the bars $g$, their inner ends being pivoted to a short connecting-bar, $i$, which can be operated by the handle or lever $j$, by means of which the notches in the bars $g$ can be made to engage with the side pieces $c$, the top of these bars passing in behind the rear upturned end, $d$, and also behind the shoulder $f$ on the bar B, thus locking the secondary frame in place and preventing its withdrawal until the parts $g$ are again brought into the position shown in Fig. 3.

I have provided a tension device to act upon the cases being filled, which, as shown, consists of two forks, $k$, one above and one below each tube, each of which is secured to the outer end of the spring $l$. The inner end of each spring is secured to an arm, $m$. All of the arms $m$ above the tubes are connected with a rod, E, and all of such arms below the tubes are connected with another rod, F. The tension of the springs can be adjusted by screws n. The ends of the rod E are supported in angular arms G, which are pivoted to the side bars B, one on each side. The rod F is in like manner supported in other arms, H, also pivoted to the side bars B.

o is an arm hanging down one from each end of the rod E. p is a similar arm extending upward, one from each end of the rod F. The free end of these arms o p is provided with a notch which engages with a pin, q, in the bar B, and in the side of such arm is another notch, which receives a pin in a slide, r, which last-mentioned pin, when in the position shown in Fig. 6, locks the arm in the position there shown. By releasing such pin by moving the slide r the tension devices above and below the tubes can be thrown down and raised up, to permit the cases to be placed upon the tubes. The mouths of the tubes are somewhat flaring, as shown at I. J is an open space between the tubes.

s are flanges or projections from the lower walls of the tubes, and the forward ends of these tubes are secured to the bar K, upon which they rest, by means of bolts similar to those shown in Fig. 11, or in other suitable manner. As shown in Fig. 7, t is a groove in the bar K.

L M are two cross-bars, the ends of which are located between the parts a c, which bars can move back and forth in the space between a and c.

N is a double crank.

O are pitman-rods extending from the crank to the sliding bar L.

P are pitman-rods also extending from the crank to the sliding bar M.

Q is a plunger or packer or packing-rod, arranged to enter one of the tubes D.

R is another similar packing-rod, arranged to enter the same tube. Each of the tubes is provided with two packers similar to Q R; but for convenience the packers are only shown in the drawings for one tube. All of the packers Q are connected with the sliding bar M, and all of the packers R are connected with the sliding bar L. All of the packers are provided with teeth or projections u, standing at an angle with the packing-rods, as shown in Fig. 2. The bars L and M are slotted, as shown in Figs. 12 and 14, and each packing-rod has a flange, v, at its outer end, and is connected with its proper bar by means of a bolt, the head of which enters a T-groove in the bar, (see Figs. 12, 13, and 14,) so that these packing-rods can be adjusted laterally, as may be necessary, when used with tubes of different sizes. The bars L and M are made circular on their under sides at the points where the pitmen are connected, and these are connected with these bars L and M by means of boxes S and bolts, as shown in Fig. 4. The arrangement of the pitmen and crank is such that the bars L and M move in opposite directions, so that while the packers Q are forced into the tubes D the packers R will be drawn out therefrom. On each side of each packing-rod I have provided a flange, w, which flanges pass under a flanged casting, d', which rests upon the top of the bar P', which is similar to the bar K, and is slotted, as shown in Fig. 11. In the slot there is a nut for each packer, and a screw, e', passes through the casting d' into the nut, thus forming guides for the packers, which guides can be adjusted laterally in the bar P'.

A' is an endless belt.

B' is a feeding-cylinder having teeth in its periphery, and rotating in the direction indicated by the arrow.

C' is a guard over the cylinder B' and at such distance therefrom as not to obstruct the passage of the material.

D' is another toothed feeding-cylinder, which rotates in the same direction as B'.

E' is a guard over D', similar to C', having perforations or openings f' at the top to permit the escape of dust, but retaining the material.

F' is another feeding roller or cylinder, which rotates in the direction of the arrow thereon.

G' is a casing covering the rollers B' D' F', in the side walls of which, or in castings upon such side walls, the journal-bearings of these feed-rollers may be located. As shown, this casing G' is connected with a shaft, H', which is journaled in the main frame A, so that the casing G' can be tilted by the shaft H' rocking in its bearings. In the top of the casing G' is an opening, I', to which a spout is connected leading to a suction-fan. The feeding-cylinder F' is peculiar in its construction and operation.

J' is a casting, two of which are used, one at each end of the cylinder F'. These castings may be secured upon the inside of the walls of the casing G'. G" is a semicircular casting secured to the casting J'. These castings are provided with a cam-groove, K', and with a journal-bearing, L'.

M' is another casting, provided with a series of recesses, a', and with an extension, b', upon one side, forming a journal. There is a casting, like M', at each end of the cylinder. Heavy strips of wood O' form the periphery of the cylinder, being fastened firmly to the castings M', leaving spaces between the strips corresponding with the spaces a' in the castings M'.

P" is a toothed bar, upon the ends of which bar are journals provided with friction-rollers c'. One of these toothed bars is placed in each one of the spaces between the strips O', there being eight in number, as shown. The friction-rollers c' are located in the cam-groove K' in the castings J'. Each of these castings J' is provided with a flange, g', upon its lower half, similar to that formed by the casting G", when in place.

N' is a metal ring, fitting inside of the flanges G" and g', and secured thereto by screws after the strips O' of the cylinder F' have been inserted in the recesses a'. A shaft extends through the center of the cylinder F', and is rigidly secured in the journals thereof, one end of which shaft extends out far enough to receive a driving-wheel.

I do not limit myself to the specific manner shown of securing the tubes D in place; but they must be secured at their inner ends only, otherwise the cases could not be placed thereon. To steady the tubes and aid in holding them in place a shoulder, h', may be provided on the under side, which comes in contact with the edge of the bar K, as shown in Fig. 9. The rear ends of the tubes are a little distance above the bar C.

In Fig. 27 I have shown a case to receive the material placed upon one of the tubes, ready to be filled. The cases may be of any suitable length, and may be made of cloth. The tubes may be round, or of other desired form, and their size can be varied at pleasure. The cylinder B' should make about twenty revolutions a minute, D' about four hundred or more, F' about fifteen or twenty.

It is not essential that the castings J' and the half-rim G" be made exactly as described.

As shown and described, there is a separate tension device for each tube; but all of them can be moved away from the tubes when the cases are to be placed thereon. It is desirable to have a separate tension device for each tube, because the several tubes may not always be in line with each other, and one may spring more than another, requiring the tension device for each tube to be separately adjusted.

I have not shown or described all of the driving mechanism; but any skilled mechanic can make and apply the same without instruction. The heads of the tubes may be cast. A strengthening-flange is shown on the under side of the bar K. A similar flange may be provided upon the bars L M. As shown, the tubes D are about two feet long, besides the heads.

The operation is as follows: The cases to be filled are to be placed upon the tubes D, which can most conveniently be done before the tubes are placed in the machine, and the length of the cases may be very much greater than that of the tubes. The tubes are then to be placed in the machine and locked in place, as shown in Figs. 1 and 2. While this is being done the tension devices above the tubes can be lifted up, and those below can be swung down out of the way. After the tubes have been placed in the machine the tension devices are to be brought into the position shown in Fig. 6. Then, if the machine be in motion, the hair or other material with which the cases are to be filled is to be fed upon the endless apron A', the movement of which will carry the material to the roller B', the teeth of which will catch the material and carry it around beneath the shield C' until it comes to the roller D', the teeth of which will catch it and carry it under the shield E', and at or near the point v' the material will be thrown by centrifugal force upon the feeding-roller F'. The bars P", which carry teeth, being placed loosely in the notches a' and in the spaces between the slats O', and the friction-rollers c' moving in the cam-groove K', the teeth upon the bars P" will be held out beyond the periphery of the feed-roll F', except when the rollers pass through that portion of the cam-groove K' which is marked w, and then the bars P" will be moved, one after the other, a little toward the center of the cylinder, and the teeth upon these bars will be drawn into the spaces between the slats O', and the material which is thrown upon this cylinder will fall upon the packers Q R and upon the bar beneath them, and the movement of the packers will carry the material forward as it falls and force it into the tubes and into the cases, the outer end of each case extending over the end of its tube and being closed. As the material is forced into the cases they will be gradually forced off from the tubes, the rapidity with which they leave the tubes and the density of the packing material in the tubes being regulated by the tension devices. The feed-rollers also serve the purpose of separating the material if matted. By using a suction-fan connecting with the tube leading from the opening I' dust can be drawn out, the same passing through the openings f' at the top of the shield E', and thus the material will be cleaned from dust. The packing-rods are arranged to move in opposite directions, and as they are provided with teeth the points of which extend toward the outer ends of the tubes, each rod, as it moves into the tube, will catch the material and force it into the tube, while the rod is being withdrawn it will not catch the material and draw it out from the tube.

What I claim as new, and desire to secure by Letters Patent, is as follows:

1. The combination, with the feeding-cylinder F', consisting of the heads M', strips O', and toothed bars P", of the castings G" J', provided with the cam-groove K', in which the friction-rollers c' rotate, all constructed and arranged substantially as described.

2. The feeding-cylinders B' D' F', in combination with one or more tubes, D, and packing-rods, substantially as and for the purpose specified.

3. The feeding-cylinder D', provided with a partial covering, E', having perforations or openings f', in combination with a case, G', provided with an opening, I', substantially as and for the purpose specified.

4. In a stuffing-machine, the combination of a series of tubes with two packers arranged to reciprocate in opposite directions within each tube and pack the material therein, substantially as described.

5. In a stuffing-machine, the combination of a series of tubes, over one end of which the cases to be filled are drawn, with two packers arranged to reciprocate in opposite directions in each tube, and a tension device for each tube, which permits the cases to gradually move from the tubes as the material is packed therein, substantially as described.

6. The combination, in a stuffing-machine, of a tube over one end of which the case to be filled is drawn, a packer arranged to force the material into the tube, pivoted arms carrying spring-jaws for holding the case on the tube, but permitting it to slide therefrom, and means for adjusting the pressure of the spring-jaws, substantially as described.

7. In a stuffing-machine, the combination of a series of tubes over which the cases to be filled are drawn, tension devices arranged to grasp the cases, but permit them to move from the tubes as the stuffing is packed therein, reciprocating packers, two of which reciprocate in opposite directions in each tube, and means for actuating the packers, substantially as described.

8. In a stuffing-machine, the combination, with a main frame, of a secondary frame carrying a series of packers and adapted to be placed upon and removed from the main frame, and locking devices on the main frame for engaging and disengaging the secondary frame, substantially as described.

9. The combination, in a stuffing-machine, of a frame provided with a series of tubes, two packers arranged to reciprocate in opposite directions within each tube, independent sliding cross-bars, with which the packers of each tube are respectively connected, a double-crank shaft, and pitmen connecting the cross-bars with such crank-shaft, substantially as described.

10. In a machine for stuffing hair and other material into cases, one or more feeding-rollers, in combination with a series of tubes, D, provided with a tension device, and packing-rods moving in opposite directions, substantially as and for the purpose specified.

FREDRICK BENOIT.

Witnesses:
　E. A. WEST,
　B. A. PRICE.